3,689,434
CATALYST FOR HYDROCARBON CONVERSION
Robert M. Suggitt and John H. Estes, Wappingers Falls, and Stanley Kravitz, Wiccopee, N.Y., assignors to Texaco Inc., New York, N.Y.
No Drawing. Filed July 29, 1968, Ser. No. 748,197
Int. Cl. B01j 11/78
U.S. Cl. 252—442
8 Claims

ABSTRACT OF THE DISCLOSURE

A method for preparing a hydrocarbon conversion catalyst composed of alumina and chlorine or bromine by contacting alumina with an activator system comprising chlorine or bromine and an inorganic sulfur compound selected from the group hydrogen sulfide and compounds corresponding to the formula $S_mX_2$. The catalyst may additionally include a metal such as platinum, palladium, ruthenium or rhodium. The catalysts so prepared are useful in such hydrocarbon conversion processes as isomerization, cracking, hydrocracking, reforming, alkylation, dehydrogenation, disproportionation and polymerization.

BACKGROUND OF THE INVENTION

Highly active hydrocarbon conversion catalysts useful for example in isomerization, alkylation, polymerization, etc. can be prepared by the methods disclosed in co-pending applications Ser. No. 646,455, filed June 16, 1967, now U.S. Pat. 3,607,959, Ser. No. 646,458, filed June 16, 1967, now abandoned and refiled Apr. 2, 1969 as continuation-in-part application Ser. No. 812,914 now U.S. Pat. 3,567,796, and Ser. No. 684,489, filed Nov. 20, 1967, now U.S. Pat. 3,523,142, all assigned to the assignee hereof. According to these disclosures catalysts are prepared by contacting alumina or composites of alumina and a metal selected from the group consisting of ruthenium, rhodium, palladium and platinum with an organic compound in the presence of chlorine or bromine at a temperature of about 200 to 800° F. While the catalysts prepared in accordance with the previous disclosures are useful in a plurality of hydrocarbon conversion processes, further investigations continue so as to provide alumina compositions with novel catalytic activator systems.

It is therefore, an object of this invention to provide a method for catalytically activating alumina for use in hydrocarbon conversion reactions.

Another object of this invention is to provide activated alumina for hydrocarbon conversion processes employing inorganic activators.

Other objects and advantages will become apparent from a reading of the following detailed description and examples.

Broadly, this invention contemplates a method for preparing a hydrocarbon conversion catalyst which comprises contacting alumina with an activator system comprising (a) chlorine or bromine and (b) an inorganic sulfur compound selected from the group consisting of hydrogen sulfide and compounds corresponding to the formula $S_mX_2$, where $m$ is from 1 to 2 and where X is chlorine or bromine at temperatures of from 350 to 750° F. such that said catalyst contains from about 3.0 to 15.0 weight percent chlorine or bromine. The catalyst may additionally contain from about 0.01 to about 5.0 weight percent of a metal selected from the group consisting of platinum, palladium, rhodium and ruthenium.

In accordance with the invention outlined above it has been found that highly active hydrocarbon conversion catalysts comprising alumina may be activated by employing a combination of chlorine or bromine and an inorganic sulfur compound. The combined activator system as herein provided for the activation of alumina gives rise to a highly active alumina catalyst albeit that the individual activator components, for example, chlorine and hydrogen sulfide in and of themselves provide no activation. In fact, such individual activator components of the type contemplated herein are generally considered catalyst inactivators or poisons. Such materials as hydrogen sulfide when introduced through a hydrocarbon feed stream and contacted with the catalyst generally resulted in rapid catalyst deactivation. Likewise the introduction of chlorine as taught in U.S. Pat. 3,240,840 is thought of as giving rise to inactive catalysts. It was therefore, totally unexpected that a combined activator system comprising, for example, chlorine and hydrogen sulfide, which individually provide no activation capability, when simultaneously introduced to and contacted with alumina convert the alumina to a highly active catalytic condition.

The alumina contacted with the novel activator system provided herein and suitable for use in hydrocarbon conversion processes may be any of the conventionally employed aluminas as for example eta-alumina, gamma-alumina, silica-alumina and other metal oxide systems. The contemplated alumina catalysts treated with the novel activator combination herein proposed are prepared by initially calcining the alumina at a temperature of from 800 to 1200° F. for periods of at least 2 hours. Where a metal such as platinum is contemplated the calcined alumina may be impregnated with an aqueous solution of chloroplatinic acid and ethylene diamine followed by drying and calcining at about 1050° F. for 2 hours thereby providing a platinized alumina composite. Where palladium is contemplated it may similarly be introduced by providing a palladium tetramine complex as by dissolving palladium chloride in hydrochloric acid and diluting with water and concentrated ammonium hydroxide followed by heating at about 140° F. with stirring for about 30 minutes until the precipitate originally formed is dissolved. The resulting solution is cooled and added to the alumina and after thorough mixing the alumina is dried at about 300° F. and thereafter calcined at elevated temperatures of from 800 to 1200° F. for periods of at least 2 hours. In a similar manner rhodium and ruthenium containing catalysts may be provided. In general, the metals are present in an amount ranging from about 0.01 and 5.0 weight percent.

Subsequent to the stabilization of the alumina, which may optionally contain a platinum group metal as described above, the catalyst is contacted with an activator system composed of an inorganic sulfur compound and molecular chlorine or bromine. As applicable inorganic sulfur compounds we mention hydrogen sulfide, sulfur dichloride, sulfur monochloride, sulfur monobromide and sulfur dibromide. While the reactions between the inorganic sulfur compound, chlorine or bromine and the surface hydroxyl groups of the alumina are not fully understood, it is believed that the surface hydroxyl groups are converted to surface chloride groups along with reaction by-products hydrogen chloride and sulfur dioxide. The alumina is contacted with a combination of molecular chlorine or bromine and inorganic sulfur compound where the mol ratio of molecular chlorine or bromine to inorganic sulfur compound is from 0.1:1 to about 4:1 and where the activation is undertaken at temperatures of at least 400° F. and up to 700° F. and preferably from about 475 to 650° F. thereby providing the alumina with about 3.0 to about 15.0 weight percent chlorine or bromine. For example, where sulfur monochloride is contemplated the mol ratio of chlorine to sulfur monochloride should be greater than 1:1. In the instance where sulfur dichloride is employed the mol ratio of chlorine to sulfur dichloride should be greater than 0.1:1. Where hydrogen sulfide is employed the mol ratio of chlorine to hydrogen sulfide should be greater than 2:1. Identical ratios prevail in those instances where bromine is employed in place of chlorine. Temperatures below about 400° F. are generally insufficient to provide a highly active catalyst useful for commercial size operations. Further, temperatures in excess of 700° F. tend to promote the formation of, for example, aluminum chloride or other side reaction products with a loss of noble metal component. Operating under the activating conditions prescribed above, pressures of atmospheric or higher may be employed.

As contemplated herein, the inventive concept includes both initial activation and regeneration of catalytically active aluminas. It would be appreciated that during the course of hydrocarbon conversion the feed stocks employed may in some instances contain sulfur bearing materials such as mercaptans, sulfides and thiophenes which in the course of operation may convert catalyst metal components such as platinum, palladium, rhodium, etc. to their sulfides and thereby inactivate the catalyst. In the course of any subsequent regeneration the presence of such sulfides are considered in determining the concentration of chlorine or bromine needed. As can be seen the sulfides form feed contaminants can be used to good advantage as a component of the activator system.

The catalyst prepared by our invention can be produced in pellet, granular, bead or pulverulent form to facilitate its use in fixed beds, moving beds, or fluidized solid beds as is well known in the art. The catalyst can be prepared in situ in a hydrocarbon conversion reactor by passing a stream of chlorine or bromine through a vessel containing the inorganic sulfur compound and discharging the effluent into a hydrocarbon conversion reactor containing the alumina where the alumina is maintained at a temperature of between 400 and 700° F. for activation. The effluent from the hydrocarbon conversion reactor consists largely of hydrogen chloride or bromide and sulfur dioxide. Any excess of chlorine or bromine in the effluent may be recycled.

While the catalyst prepared in accordance with the invention herein described above exhibits good catalytic activity, it has been found advantageous to follow the activation step with another operation which is intended to remove residual traces of adsorbed sulfur compounds. If these sulfur compounds are left in contact with a metal containing formulation they may be slowly converted to sulfides on contact with a hydrogen or hydrocarbon stream and formation of metal sulfide can reduce catalytic activity. To minimize any remaining traces of sulfur the activated catalyst may be further treated by heating at a temperature of from 700 to 1000° F. in the presence of a nonreactive gas such as air, helium, nitrogen or hydrogen at pressures of from atmospheric to 1000 p.s.i.a. for at least 0.1 hour and thereafter contacting the catalyst with hydrogen chloride or hydrogen bromide at a temperature of from 150 to 600° F. for at least 0.5 hour. The additional heat treatment provided herein has been found to measurably enhance catalyst stability and activity.

The catalyst prepared in accordance with this invention is highly active at relatively low temperatures and find application in a broad spectrum of hydrocarbon conversion processes including isomerization, cracking, hydrocracking, reforming, alkylation, dehydrogenation, disproportionation and polymerization. Illustratively, benzene is alkylated with ethylene in the presence of the chlorided or bromided alumina catalyst at temperatures ranging from about 150 to 400° F. Alkane streams consisting chiefly of light isoparaffins are alkylated in the presence of olefins employing our catalyst at temperatures ranging from about 100 to 400° F. Again, polymerization of olefins such as propylene or butene may be conducted at temperatures ranging from about −100 to 300° F. When the catalyst activated as described above contains in addition a noble metal such as platinum, a highly efficient isomerization catalyst is obtained whereby isomerization of streams consisting of $C_4$ to $C_7$ alkanes are isomerized at temperatures of from 250 to 400° F. In general, pressures from atmospheric to the practical maximum as limited by materials of construction may be employed. When employing the catalyst provided herein the above hydrocarbon conversion processes may be conveniently undertaken employing liquid hourly space velocities (LHSV), i.e. the volume of liquid charge per volume of actalyst per hour, within the range of about 0.25 to 20 and preferably from 1 to 8.

In order to more fully illustrate the nature of our invention and method of practicing the same the following examples are presented.

Example I 166 grams of a catalyst comprising 0.6 percent platinum on alumina was calcined at 450° F. for 6 hours. At the same temperature sulfur monochloride was evaporated into an air stream and the stream passed over the catalyst bed. The catalyst containing 6 weight percent chlorine was subsequently stabilized by heating in a hydrogen atmosphere at 800° F. for 5 hours following by further treatment with hydrogen chloride at 500° F. for 2 hours. The material was evaluated for hexane isomerization activity employing the following conversion conditions: temperature of 300° F., LHSV of 1, 300 p.s.i.g. of hydrogen pressure and at a hydrogen to hydrocarbon mol ratio of 3.2:1. A total conversion of hexane of 16 weight percent was obtained. An evaluation of the catalyst prepared above omitting the stabilizing heat treatment in hydrogen at 800° F. followed by further heat treatment with hydrogen chloride at 500° F. resulted in zero conversion of hexane under the same isomerization conditions.

Example II

A gaseous mixture consisting of 20 weight percent chlorine in air was passed through preheated sulfur monochloride and the mixed streams were passed over a precalcined catalyst comprising 0.6 weight percent platinum on alumina maintained at 450° F. at the rate of one-half cubic foot per hour. A total of 10 milliliters of sulfur monochloride were used during activation over a period of 4 hours. The resulting catalyst containing 9.0 weight percent chlorine was evaluated for hexane isomerization under the conditions specified in Example I. A total hexane conversion of 89 weight percent was obtained with a 28.3 weight percent conversion to 2,2-dimethylbutane.

Example III

A calcined catalyst comprising 0.5 weight percent palladium on alumina was subjected to a gaseous stream containing 2.2 mols of chlorine per mol of hydrogen sulfide at a temperature of 575° F. for 3 hours. This material was thereafter stabilized by heating in hydrogen at 800° F. for 5 hours followed by treatment with hydrogen chloride at 500° F. for 2 hours. The resultant catalyst possesed a chlorine content of 6.36 weight percent. The catalyst was evaluated for hexane isomerization at conversion conditions of 300° F., 1.0 LHSV, 300 p.s.i.g. of hydrogen pressure and a hydrogen to hydrocarbon mol ratio of 3.2:1. A total hexane conversion of 87.8 weight percent was obtained with 30.2 weight percent conversion to 2,2-dimethylbutane.

Example IV

A gaseous mixture consisting of hydrogen sulfide and chlorine as in Example III was passed over a precalcined base comprising 0.6 weight percent platinum on alumina at a temperature of 550° F. thereby providing a catalyst containing 6.3 weight percent chloride and 1.2 weight percent sulfur on its surface. The catalyst was subsequently stabilized by treating in a hydrogen atmosphere at 800° F. followed by hydrogen chloride treatment as set forth in Example I. Evaluation of the catalyst for hexane isomerization under the conversion condtions specified in the preceding examples resulted in a conversion of 84.8 weight percent including 14.4 weight percent 2,2-dimethylbutane.

We claim:

1. A method for preparing a hydrocarbon conversion catalyst which comprises contacting alumina with an activator system consisting essentially of (a) chlorine or bromine and (b) an inorganic sulfur compound selected from the group consisting of hydrogen sulfide and compounds corresponding to the formula $S_mX_2$, where $m$ is from 1 to 2 and where X is chlorine or bromine at temperatures of from 350 to 750° F. wherein the mol ratio of said chlorine or bromine to said inorganic sulfur compound is from 0.1:1 to about 4:1 such that said catalyst contains from about 3.0 to 15.0 weight percent chlorine or bromine.

2. A method according to claim 1 wherein said catalyst additionally contains from about 0.01 to 5.0 weight percent of a metal selected from the group consisting of platinum, palladium, rhodium and ruthenium.

3. A method according to claim 1 wherein said activator system consisting essentially of chlorine and sulfur monochloride and where the mol ratio of chlorine to sulfur monochloride is from about 1:1 to 4:1.

4. A method according to claim 1 wherein said activator system consisting essentially of chlorine and sulfur dichloride and where the mol ratio of chlorine to sulfur dichloride is from about 0.1:1 to 4:1.

5. A method according to claim 1 wherein said activator system consisting essentially of chlorine and hydrogen sulfide and where the mol ratio of chlorine to hydrogen sulfide is from about 2:1 to 4:1.

6. A method according to claim 1 wherein said temperature is from 475 to 650° F.

7. A method according to claim 1 which additionally comprises heating said catalyst to a temperature of from 700 to 1000° F. in the presence of a non-reactive gas and thereafter contacting said catalyst at a temperature of from 150 to 600° F. with hydrogen chloride or hydrogen bromide.

8. A hydrocarbon conversion catalyst prepared according to claim 1.

References Cited
UNITED STATES PATENTS

| | | | |
|---|---|---|---|
| 2,972,649 | 2/1961 | Thomas et al. | 252—442 X |
| 3,322,688 | 5/1967 | Starnes | 252—439 |
| 3,330,779 | 7/1967 | Giannetti et al. | 252—439 X |
| 3,440,301 | 4/1969 | Lafferty et al. | 252—442 X |

PATRICK P. GARVIN, Primary Examiner

U.S. Cl. X.R.

260—683.75; 252—439, 441